(12) United States Patent
Jung (10) Patent No.: US 6,323,457 B1
(45) Date of Patent: Nov. 27, 2001

(54) LASER ANNEALING APPARATUS

(75) Inventor: Yun-Ho Jung, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/210,081

(22) Filed: Dec. 11, 1998

(30) Foreign Application Priority Data

Feb. 18, 1998 (KR) .................................................. 98-4977

(51) Int. Cl.⁷ ................................................. B23K 26/00
(52) U.S. Cl. ................................. 219/121.83; 219/121.62
(58) Field of Search .................... 219/121.61, 121.62, 219/121.65, 121.85

(56) References Cited

U.S. PATENT DOCUMENTS 4,316,074 * 2/1982 Daly ..................................... 219/121
4,695,697 * 9/1987 Kosa ..................................... 219/121

* cited by examiner

Primary Examiner—Rodney Bovernick
Assistant Examiner—Gioacchino Inzirillo
(74) Attorney, Agent, or Firm—Long Aldridge & Norman LLP (57) ABSTRACT

A laser annealing apparatus has a laser generating section for producing a laser beam, a splitter arranged to partially reflect and partially transmit the laser beam. The apparatus has a first energy converting section for measuring the energy value of the laser beam reflected from the splitter and outputting it into an electrical signal and has an energy control section for comparing the output signal of the first energy converting section to a reference value and automatically correcting the energy value by the difference between them. A process window may be positioned so the laser beam can pass through a built-in slit for annelaing a substrate. The apparatus further has a second energy converting section for measuring the energy value of the laser beam passing through the process window. In response to the output of the second energy converting section, the energy control section corrects the energy intensity of the laser beam.

5 Claims, 5 Drawing Sheets

LASER ANNEALING APPARATUS

BACKGROUND OF THE INVENTION

1. Field of the Invention

The present invention relates to a laser annealing apparatus and, particularly, to a laser annealing apparatus which is adapted to supply a laser beam of a desired energy value uniformly by automatically correcting the laser energy value resulting from damages in the optical system that occur during application of the laser beam to amorphous silicon layer.

2. Discussion of Related Art

The most widely used thin film transistors for liquid crystal displays have been amorphous silicon thin film transistors (TFT) which are fabricated at a low temperature. In recent years, low temperature polysilicon thin film transistors are considered highly useful in fabricating TFTs because of their high mobility of electrons or holes relative to amorphous silicon. The polysilicon thin film transistors are advantageous in that they have both data and gate driver circuits manufactured with a pixel array on a glass substrate and, when applied to a pixel device, they can provide high image quality and aperture rate because switching devices can be miniaturized.

One of the most important techniques for fabricating low temperature polysilicon thin film transistors is crystallization using an eximer laser applied to an amorphous silicon thin film at a low temperature of below 400° C.

This technique melts amorphous silicon with a radiated energy, such as laser, within a short time and cools the molten matter to extract crystals. Small crystal seeds initially produced are grown to crystalline aggregates. Growth conditions determine the growth orientation of crystals, which leads to single-crystallization in a single growth direction, or poly-crystallization in multiple directions. The energy uniformity of a laser beam applied to the amorphous silicon is also a factor that determines crystallization properties, such as crystal size, roughness of crystal surface and crystal orientation.

Figure 1:
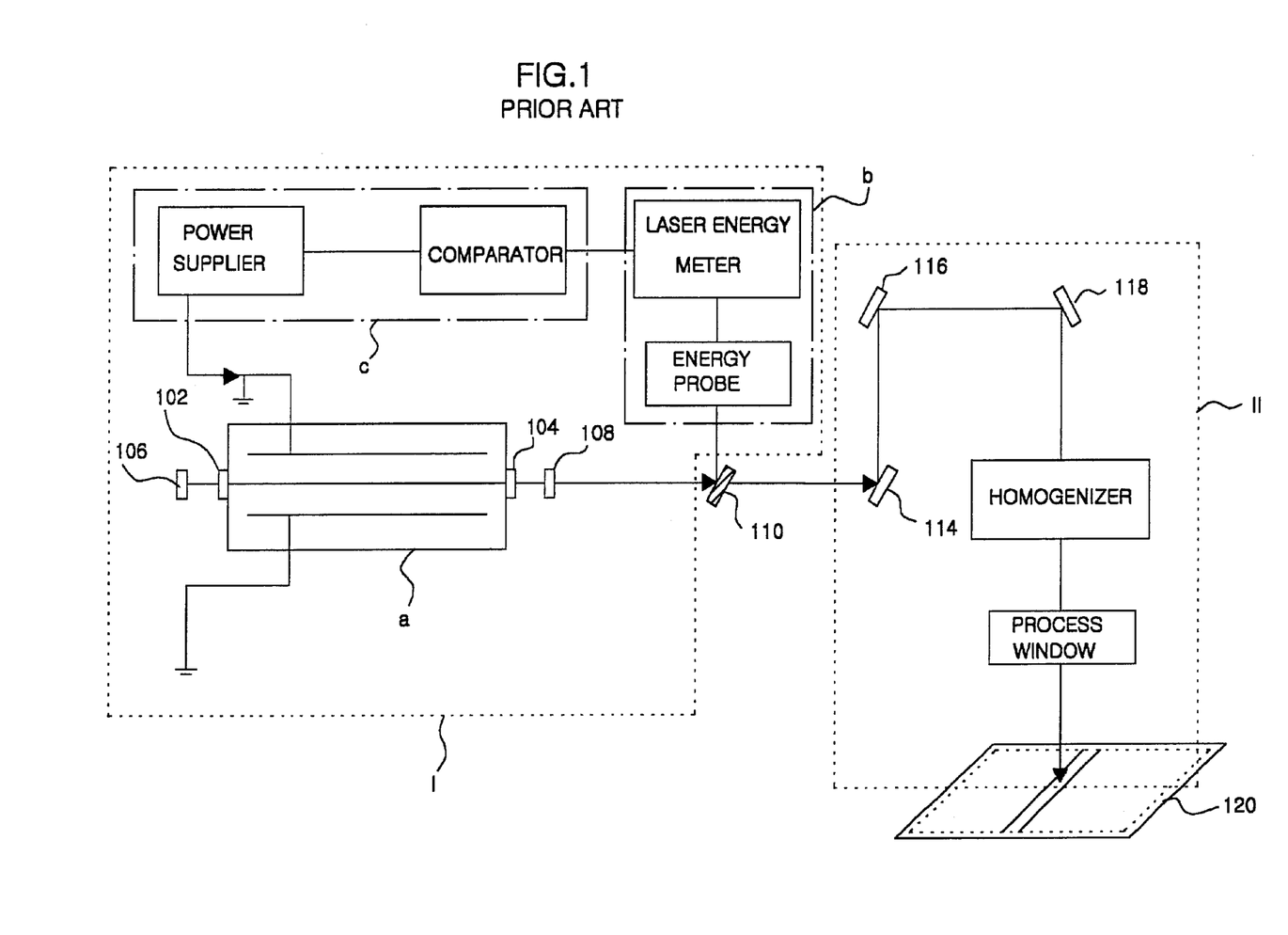
FIG. 1 is a schematic illustration of a conventional laser annealing apparatus.

FIG. 1 is a schematic illustration of a conventional laser annealing apparatus. A conventional laser annealing apparatus is divided into two parts: a laser generating and setting device I for generating a laser beam and measuring the energy value of the laser beam, which energy value is converted to an electrical signal and compared to a predetermined reference value, and applying a voltage as high as the difference between the measured and reference values, so as for the laser to be set to a desired energy value; and a process device II for applying the laser beam of the desired energy value set by the laser generating and setting device I to a sample, such as amorphous silicon.

In the conventional laser annealing apparatus, the laser generating and setting apparatus I includes a laser generating section (a), an energy converting section (b) and an energy control section (c) In particular, the laser generating section (a) produces a laser beam from injected sources which are decomposed by the applied voltage and undergo a reaction. The energy converting section (b) has an energy probe for detecting heat energy of the laser beam emitted from the laser generating section (a), and a laser energy meter for converting the detected heat energy to an electrical signal. The energy control section (c) includes a comparator for comparing the electrical signal output from the laser energy meter with a reference value, and a power supplier for applying a voltage to the laser generating section (a) based on the output signal of the comparator.

The process device II, which is connected to the laser generating section (a) of the laser generating and setting device II and applies a laser beam to the amorphous silicon, comprises a homogenizer for making the set energy density of the laser beam uniform, and a process window through which the laser beam homogenized is applied to a sample 120, amorphous silicon.

A process for applying a laser beam of a desired energy value to the amorphous silicon with the conventional laser annealing apparatus of the aforementioned construction will be described as follows.

When injecting Xe and HCl gases into the laser generating section (a) and applying a required voltage through the power supply, the gases undergo the following reaction I to produce a laser beam (XeCl) having a short wavelength.

$$Xe + HCl \rightarrow XeCl \tag{I}$$

The laser beam passes through a first window 102 formed at the one end of the laser generating section (a), being amplified and reflected through a first lens 106 which is arranged in parallel with the first window 102. After the first lens 106, the laser beam passes through a second lens 108 via a window 104 which is located at the other end of the laser generating section (a). A splitter 110 is adapted for 99% of the laser beam to be passed through and for the rest of the beam to be reflected.

About 1% of the laser beam is transmitted to the energy converting section (b) by the splitter 110, while the rest 99% is transmitted to the process device II.

At this stage, the percentage of laser beam reflection or transmittance depends on the composition of the layer coated on the surface of the splitter 110.

The energy probe senses heat of the 1% portion of the laser beam reflected from the splitter 110 and calculates the heat energy interms of energy units, which is output as an electrical signal through to laser energy meter.

This output signal is applied to the comparator and compared with a reference value. The electrical signal output from the comparator is digitized and sent to the power supplier. The power supplier applies a voltage corresponding to the digitized electrical signal to the laser generating section (a).

The laser generating section (a) produces a laser beam with an energy value depending on the applied voltage. Once the laser beam is set to a desired energy value in the manner as described above, the remaining 99% portion of the laser beam is transmitted to the process device II through the slit 110.

A process for applying this 99% portion of the laser beam at the process device II to amorphous silicon will be described as follows. After passing through the splitter 110, the direction of the laser beam is changed by an angle through mirrors 114, 116 and 118 and transmitted to the homogenizer.

Figure 2:
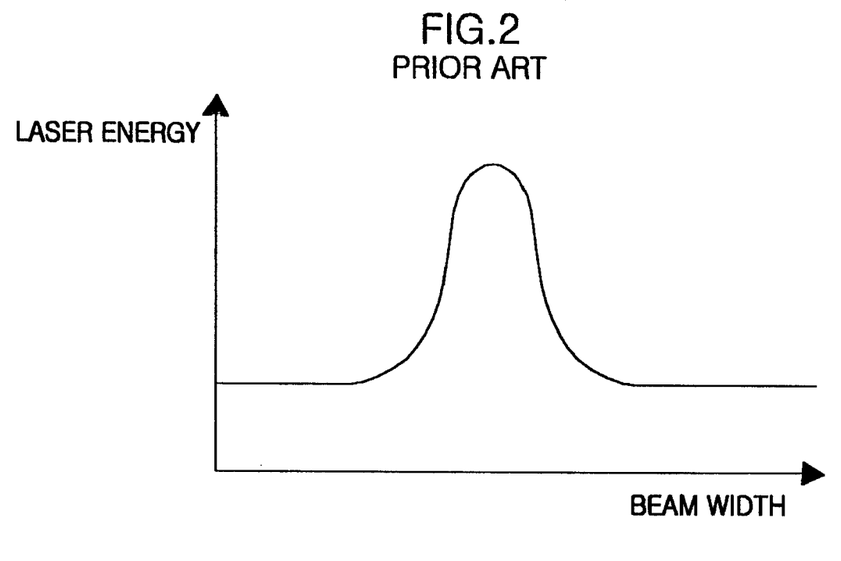
FIG. 2 is a graph showing a Gaussian-shaped energy distribution of a laser beam.
Figure 3:
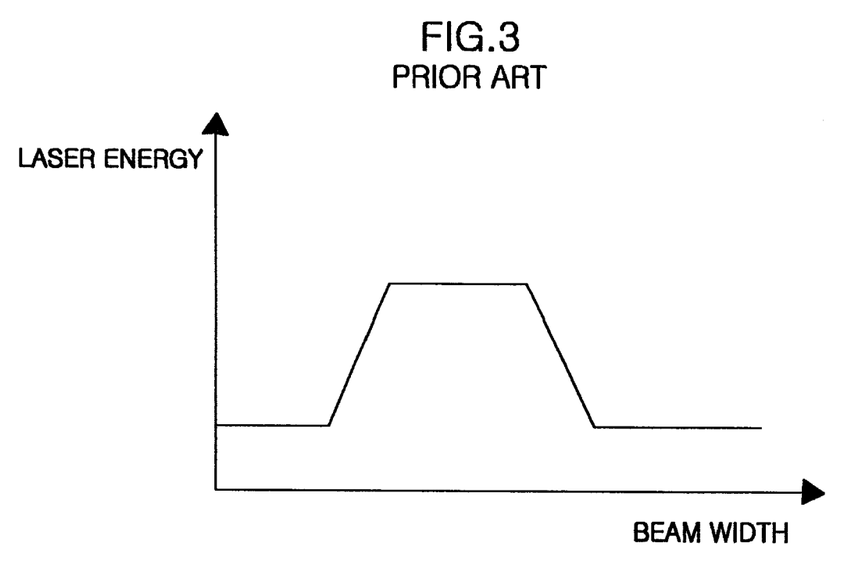
FIG. 3 is a graph showing an energy distribution of the laser beam through a homogenizer.

Generally, a laser beam has a high energy density in the center relative to the peripheral part and has a Gaussian-shaped energy distribution as shown in FIG. 2. The homogenizer sets the energy distribution of the laser beam such that the top energy distribution is substantially flat and even, as illustrated in FIG. 3. As the laser beam having such an even energy distribution is irradiated on the sample 120 through the window, the amorphous silicon undergoes crystallization.

However in the prior art, as the laser process is repeated over and over, the internal parts of the apparatus, such as a plurality of mirrors, a slit, lenses of a homogenizer, and a process window are susceptible to contamination and damages. Thus a use of damaged apparatus may cause a laser generating and setting device to apply a laser beam of inaccurate energy value to the amorphous silicon.

SUMMARY OF THE INVENTION

Accordingly, it is an objective of the present invention to provide a laser annealing apparatus adapted to set a laser beam to have a desired energy value in applying the laser beam to amorphous silicon.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

In an aspect of the present invention, a laser annealing apparatus includes: a laser generating section for producing a laser beam; a slit adapted to be fixed for the laser beam to be passed through or reflected; a first energy converting section for measuring the energy value of the laser beam reflected from the slit and outputting it into an electrical signal; an energy control section for comparing the output signal of the first energy converting section to a reference value and automatically correcting the energy value by the difference between them; a process window adapted to be fixed for the laser beam passed through the slit to be applied to a sample, said laser beam having the energy value corrected by the energy control section; and a second energy converting section for measuring the energy value of the laser beam applied from the process window and outputting it into an electrical signal, said electrical signal being transmitted to the energy control section.

In another aspect of the present invention, a laser annealing apparatus includes: a laser generating section for producing a laser beam; a process window for applying the laser beam to a sample; a slit adapted to be fixed between the process window and the sample for the laser beam applied from the process window to be passed through or reflected; an energy converting section for measuring the energy value of the laser beam reflected from the slit and outputting it into an electrical signal; and an energy control section for comparing the output signal of the energy converting section to a reference value, automatically correcting the energy value by the difference between them, and outputting it to the laser generating section.

In further another aspect of the present invention, a laser annealing apparatus includes: a laser generating section for producing a laser beam; a slit adapted to be fixed for the laser beam to be passed through or reflected; a first energy converting section for measuring the energy value of the laser beam reflected from the slit and outputting it into an electrical signal; an energy control section for comparing the output signal of the first energy converting section to a reference value, automatically correcting the energy value by the difference between them, and outputting it to the laser generating section; a process window adapted to be fixed for the laser beam passed through the slit to be applied to a sample, said laser beam having the energy value corrected by the energy control section; and a second energy converting section for measuring the energy value of the laser beam applied from the process window and outputting it into an electrical signal, said electrical signal being transmitted to the energy control section.

These and other aspects, features and advantages of the present invention will be better understood by studying the detailed description in conjunction with the drawings and the accompanying claims.

BRIEF DESCRIPTION OF THE ATTACHED DRAWINGS

A detailed description of embodiments of the invention will be made with reference to the accompanying drawings, wherein like numerals designate corresponding parts in the several figures.

DETAILED DESCRIPTION OF PREFERRED EMBODIMENTS

Hereinafter, the invention will be described in further detail by way of examples with reference to the accompanying drawings.

Figure 4:
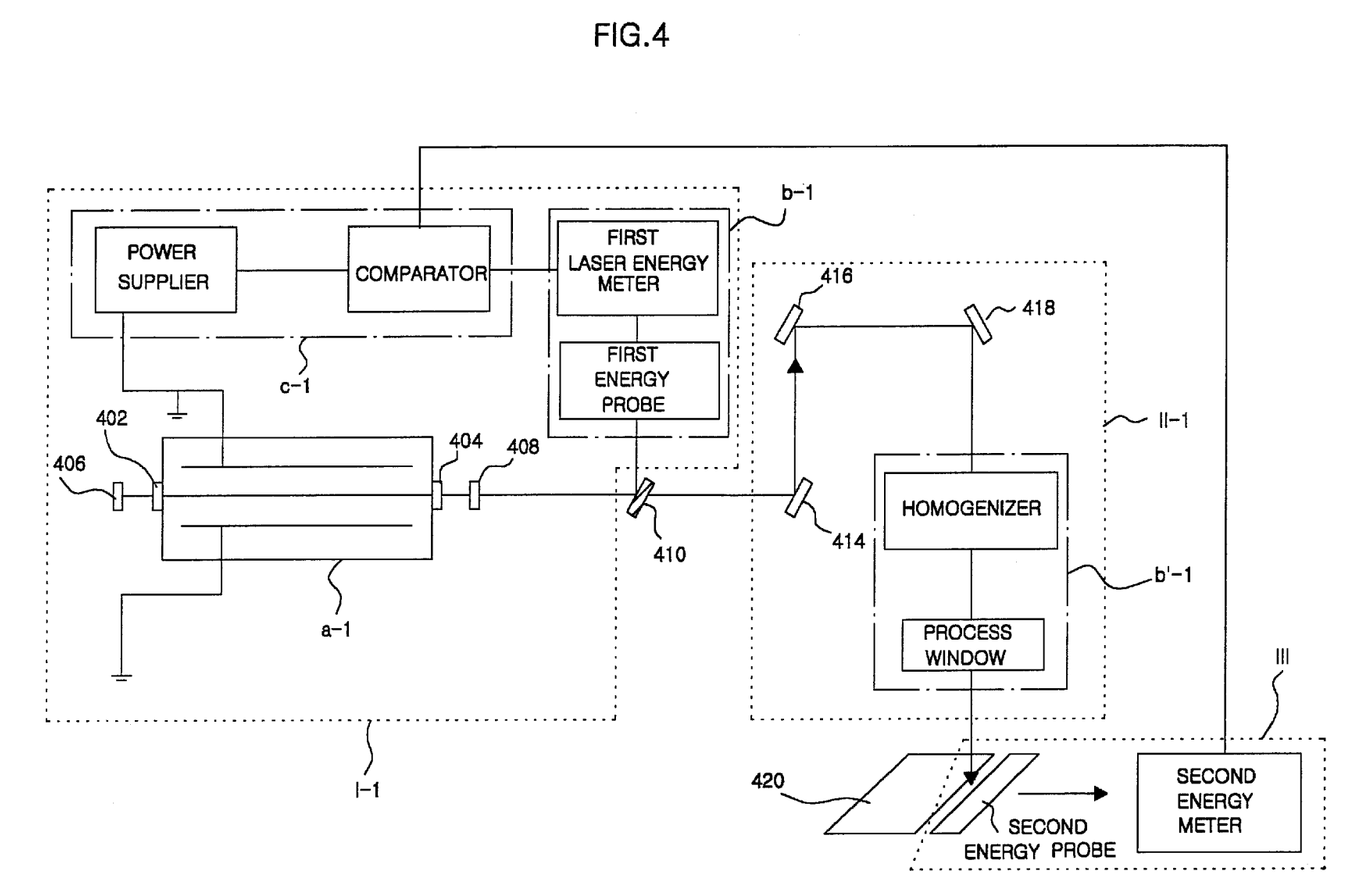
FIG. 4 is a schematic illustration of a laser annealing apparatus in accordance with a first embodiment of the present invention.

FIG. 4 is a schematic illustration of a laser annealing apparatus in accordance with a first embodiment of the present invention. The laser annealing apparatus according to the first embodiment is divided into three parts: a laser generating and setting device I-1 for generating a laser beam, measuring the energy value of the laser beam, which value is converted to an electrical signal and compared to a reference value, and applying a voltage as high as the energy difference between the measured and reference values to set the output of the laser to a desired energy value; a process device II-1 for applying the laser beam of the desired energy value set by the laser generating and setting device II-1 to amorphous silicon; and a test device III for alternatively detecting and setting the laser beam applied from the process device II-1 to have a desired energy value.

The laser generating and setting device I-1 comprises a laser generating section (a-1) for producing a laser beam from injected sources which are decomposed and reacted in response to a first energy converting section (b-1) having a first energy probe for sensing heat of the laser beam minutely generated from the laser generating section (a-1) in terms of energy units, and a first laser energy meter for outputting the energy value of the laser beam from the first energy probe into an electrical signal; and an energy control section (c-1) preferably having a comparator for comparing the electrical signal output from the first laser energy meter with a reference value, and a power supplier for applying a voltage to the laser generating section (a-1) based on the output signal of the comparator.

The process device II-1, which is connected to the laser generating section (a-1) of the laser generating and setting device I-1 and applies a laser beam onto the amorphous silicon, comprises a homogenizer for uniformly distributing the heat energy of the laser beam at a defined interval, and a process window through which the homogenized laser beam is applied to the amorphous silicon.

The test device III, which is connected to and provides a feedback to the laser generating and setting device I-1, defects the energy of the laser beam irradiated through the process window and converts it to an electronic signal readable by the comparator. The test device III has a second desired energy value, comprises a second energy converting section (b'-1) which has a second energy probe for sensing heat of the laser beam minutely irradiated from the process window and calculating the heat in terms of energy units, and a second laser energy meter for outputting the energy value of the laser beam from the second energy probe in to an electrical signal. The electrical signal of the second laser energy meter is fed to the comparator, which repeats the aforementioned process, and the laser beam to be applied to the amorphous silicon is set to have a desired energy value.

In particular, the output signals of the first and second laser energy meters are fed to the comparator and compared with a reference value. The output signal of the comparator is applied to the power supplier, which in turn applies a corresponding voltage acceptable to the laser generating section. Thus the energy value of the final laser beam in the first embodiment of the present invention is obtained by the test device.

In the first embodiment of the present invention, the second energy probe is preferably arranged in a separate adjacent platform next to the sample 420 being treated with the laser beam. In general, the amount of energy reaching the sample 420 is directly related to the separation distance between the sample 420 and the source of the laser beam. Thus, as more materials are fabricated onto the sample 420, the separation distance is reduced, hence delivering more energy to the sample 420. To alleviate this problem, it is preferable that the height of the platform supporting the second energy probe be adjustable to compensate for the thickness of the sample 420, such as amorphous silicon.

The present invention may be connected to a microprocess so that the detection and correction of the laser beam's energy occurs in a predetermined duration. The microprocessor will automate the detection of the laser beam energy in each such duration and automatically adjust the output of the laser so that correct energy is always applied to the sample.

A process for applying a laser beam of a desired energy value to amorphous silicon with the laser annealing apparatus of the first embodiment of the present invention as constructed above will be described as follows.

In the laser annealing apparatus, laser sources supplied to the laser generating section (a-1) undergo a reaction in response to a voltage applied through the power supplier and generates a laser beam (XeCl). The produced laser beam passes through a first window 402 disposed at the one end of the laser generating section (a-1), being amplified and reflected through a first lens 406 which is arranged in parallel with the first window 402. After the first lens 406, the laser beam passes through a second window 404 formed at the other end of the laser generating section (a-1) and reaches a splitter 410 via a second lens 408 which is arranged in parallel with the second window 404.

Subsequently, the laser beam is preferably divided into reflected and transmitted portions at a predetermined ratio. At this stage, the percentage of beam reflection or transmittance depends on the composition of the layer coated on the surface of the splitter 410. Preferably, the splitter 410 is adapted for 1% of the laser beam to be reflected and 99% of the laser beam to be passed through.

The 1% portion of the laser beam is reflected from the splitter 410 and transmitted to the first energy probe, the 99% portion of the beam is passed through the splitter 410 and reaches the process device II-1. In an error free condition, the 1% of the laser beam reflected from the splitter 410 is set to have a desired energy value when a predetermined voltage is applied to the laser generating section.

The laser beam passes through the splitter 410, gets rerouted through respective mirrors 414, 416 and 418 and reaches the homogenizer. Because a typical laser beam has uneven energy density, that is, higher in the center than in the peripheral part, the homogenizer is used to uniformly distribute the energy of the laser beam. The laser beam with substantially homogenized energy distribution is applied to the amorphous silicon via the process window.

During the irradiating process, the laser beam irradiated from the process window may have a different energy value due to contamination of the respective mirrors, lenses fixed on the homogenizer, or the process window. As there may be possible changes in the energy of the laser beam set by the laser generating and setting device I-1, the first embodiment of the present invention uses the separately provided test device III to compare the energy of the laser beam minutely applied from the process window with a desired reference value and control the output of the laser beam to have a desired energy value.

In particular, the laser beam from the process window is detected by a second energy probe of the test device III, and calculated. The value is calculated in terms of energy units and is converted to an electrical signal by the laser energy meter and fed to the comparator. The electrical signal is compared to a reference value at the comparator and the output signal of the comparator is applied to the power supplier. The power supplier applies a voltage corresponding to the resulting value to the laser generating section (a-1).

Through the process, as the energy of the laser beam reaches a desired value, the laser beam is applied to a sample 420, such as amorphous silicon, via the process window in the process device II-1.

As described in connection with the first embodiment of the present invention described above, the laser generating and setting device I-1 initially adjusts the laser beam to have a desired energy value, and the test device III readjusts the laser beam which has been passed through the process window via the process device II-1. This process provides a substantially accurate energy value of the laser beam to the sample 420.

Figure 5:
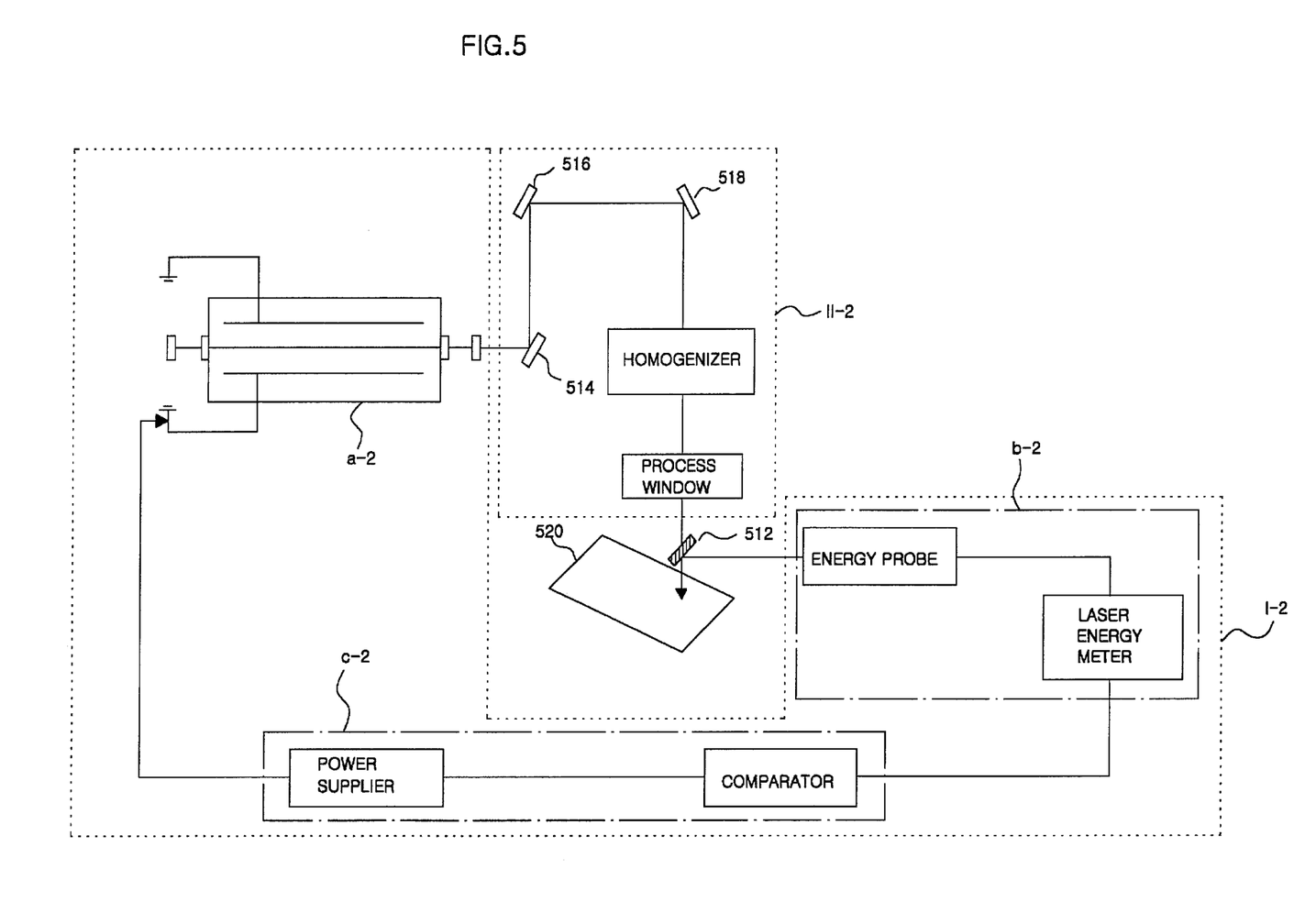
FIG. 5 is a schematic illustration of a laser annealing apparatus in accordance with a second embodiment of the present invention.

FIG. 5 is a schematic illustration of a laser annealing apparatus in accordance with a second embodiment of the present invention. According to the second embodiment, the laser annealing apparatus is divided into two parts: a laser generating and setting device I-2 for generating a laser beam and setting it to have a desired energy value; and a process device II-2 for applying the laser beam of the desired energy value set by the laser generating and setting device II-2 to amorphous silicon.

The laser generating and setting device I-2 comprises: a laser generating section (a-2) for producing a laser beam from injected sources which are decomposed and reacted in response to an applied voltage; an energy converting section (b-2) having an energy probe for sensing the heat of the laser beam irradiated from a process window and calculating it in terms of energy units, and a laser energy meter for outputting the energy value of the laser beam received from the energy probe into an electrical signal; and an energy control section (c-2) having a comparator for comparing the output signal applied from the laser energy meter with a reference value and outputting the result into digitized signal, and a power supplier for applying a voltage to the laser generating section (c-2) based on the output signal of the comparator.

The process device II-2 includes a homogenizer for making uniformly distributing the energy density of the laser beam from the laser generating section (a-2), and a process window through which the laser beam outputted from the homogenizer is applied to a sample 520, such as amorphous silicon.

A process for applying a laser beam of a desired energy value to the amorphous silicon with the laser annealing apparatus as constructed above in the second embodiment will be described as follows.

A laser beam is produced from the laser generating section (a-2) in the same manner as described in connection with the first embodiment. The direction of the laser beam is determined by mirrors 514, 516 and 518. Then the laser beam with homogenized energy distribution is applied to the amorphous silicon via the process window.

According to the second embodiment of the present invention, the energy probe senses the heat of the laser beam irradiated from the process window and splitted by a splitter 512 and calculates it in terms of energy units in order to determine whether the energy value of the laser beam from the process window is substantially equal to the desired value of the laser produced from the laser generating section (a-2). The splitter 512 separates about 1% of the laser beam to the energy probe. The calculated energy value is converted to an electrical signal by the laser energy meter and fed to the comparator. The electrical signal is compared to a reference value at the comparator. The outputted electrical signal of the comparator is applied to the power supplier. The power supplier applies a voltage corresponding to the resulting value to the laser generating section (a-2). As a consequence, the laser generating section (a-2) produces a laser beam having an energy value determined by the applied voltage. In the second embodiment, the splitter 512 may be positioned between the homogenizer and the processor window.

Through this process, the laser beam which has been set to have a desired energy value is applied to the sample 520, such as amorphous silicon, via the process window. Such as in the second preferred embodiment of the present invention, it is possible to supply an accurate energy since the laser beam irradiated through the process window is set to have a desired energy value and applied to the amorphous silicon.

Figure 6:
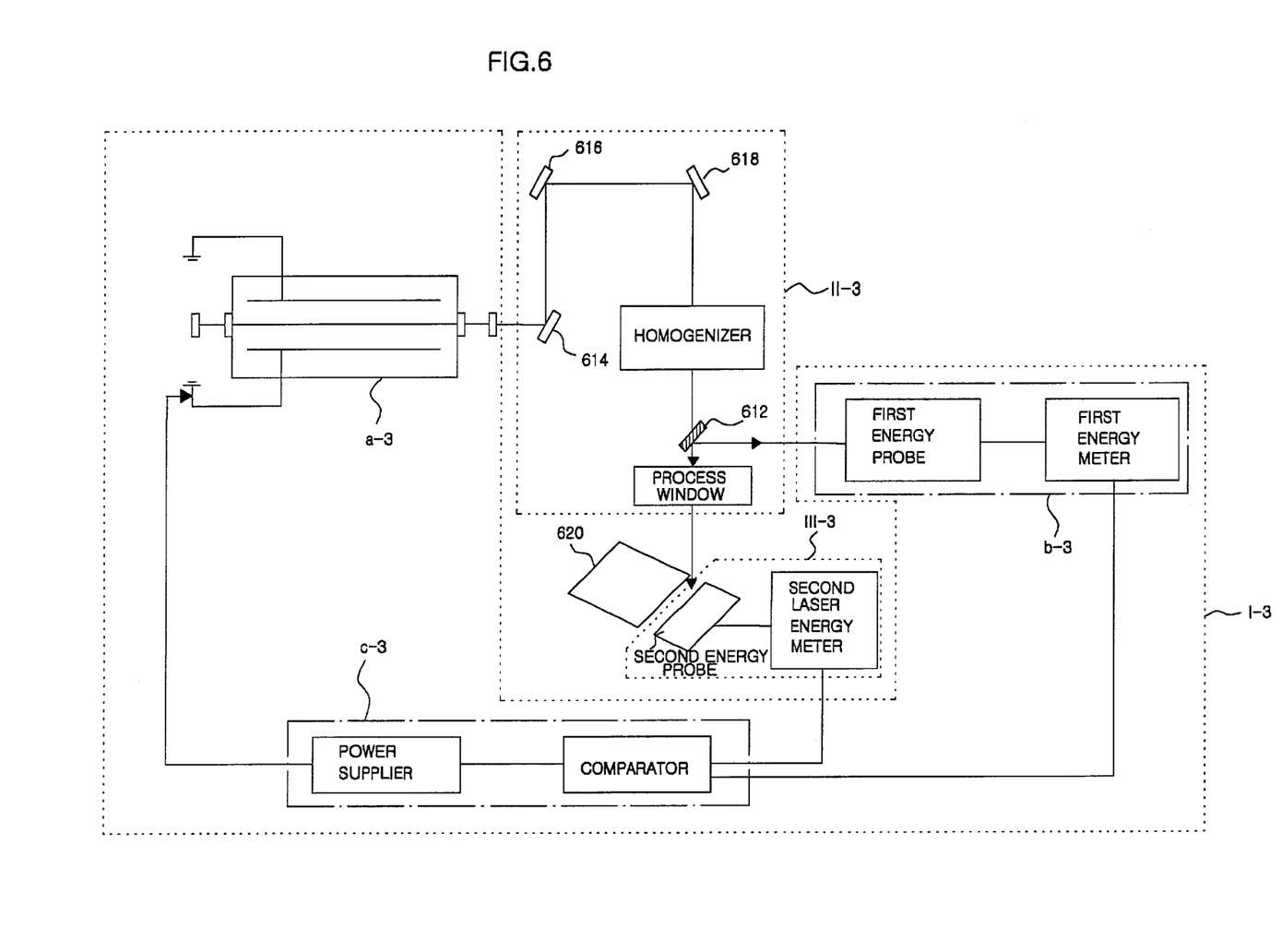
FIG. 6 is a schematic illustration of a laser annealing apparatus in accordance with a third embodiment of the present invention.

FIG. 6 is a schematic illustration of a laser annealing apparatus in accordance with a third embodiment of the present invention.

The present laser annealing apparatus, according to the third embodiment, is adapted to set the laser beam generated from a laser generating section to a desired energy value for the first time, and then set the laser beam irradiated from the process window for a second time.

The apparatus is divided into three parts: a laser generating and setting device I-3 for generating a laser beam and setting it to have a desired energy value; a process device II-3 for applying the laser beam of the desired energy value set by the laser generating and setting device II-3 to amorphous silicon; and a test device III-3 for secondarily setting the laser beam applied from the process device II-3 to a desired energy value.

The laser generating and setting device I-3 comprises a laser generating section (a-3) for producing a laser beam of an energy value determined by an applied voltage; a first energy converting section (b-3) having a first energy probe for sensing heat of the laser beam irradiated from the process device II-3 in terms of energy units, and a first laser energy meter for outputting the energy value of the laser beam from the first energy probe into an electrical signal; and an energy control section (c-3) having a comparator for comparing the electrical signal applied from the first laser energy meter with a reference value and outputting a digitized resulting signal, and a power supplier for applying a voltage to the laser generating section (a-3) based on the output signal of the comparator.

The process device II-3 includes a homogenizer for setting the laser beam generated from the laser generating section (a-3) to have uniform energy density; and a process window through which the laser beam homogenized is applied to the amorphous silicon.

The test device III-3 comprises a second energy converting section, which has a second energy probe for sensing heat of the laser beam minutely irradiated from the process window in terms of energy units, and a second laser energy meter for outputting the energy value of the laser beam applied from the second energy probe into an electrical signal. The second energy converting section is electrically connected to the energy control section (c-3) and sets the laser beam irradiated from the process window in the same manner as described above.

A process for applying a laser beam of a desired energy value to the amorphous silicon with the laser annealing apparatus as constructed above in the third embodiment will be described as follows.

The laser beam generated from the laser generating section (a-3) is first set to have uniform energy distribution through the homogenizer in the process device II-3 in the same manner as described above, and then, reflected from or passed through a splitter 612. At this stage, preferably the 99% portion of the beam passes through the process window and the 1% of the beam is transmitted to the first energy probe, which senses heat from the laser beam in terms of energy units. This energy value is converted to an electrical signal at the first laser energy meter and fed to the comparator. The electrical signal is then compared to a reference value at the comparator and the digitized output signal of the comparator is applied to the power supplier. The power supplier applies a voltage corresponding to the resulting value to the laser generating section (a-3). Through this process, the laser beam is set to have a desired energy value depending on the voltage applied to the laser generating section (a-3) for the first time. Alternatively, the splitter 612 may be positioned after the process windows.

The laser beam set to a desired energy value passes through respective mirrors 614, 616 and 618 in the process device II-3 and is transmitted to the homogenizer, which outputs the laser beam having uniform energy distribution. About 1% of the laser beam is reflected from the splitter 612 and is transmitted to the energy converting section, while about 99% of the laser beam passes through the splitter 612 to the process window. The heat of the laser beam irradiated from the process window is sensed and calculated in terms of energy units through the second energy probe. The second laser energy meter converts the energy value to an electrical signal. The signal is fed to the comparator and compared to a reference value. The output signal of the comparator is digitized and applied to the power supplier. The power supplier applies a voltage corresponding to the output value to the laser generating section (a-3). Thus the laser beam is secondly set to a desired energy value depending on the voltage applied to the laser generating section (a-3).

This laser beam is transmitted to the process window via the process device III-3 and applied to a sample 620, such as amorphous silicon. Such as in the third embodiment of the present invention, it is possible to irradiate a laser beam with an accurate energy value through two times of setting of the laser beam.

As described above, the present laser annealing apparatus is adapted to set the laser beam to have a desired energy value and applied to the amorphous silicon.

That means, it is possible to obtain silicon layers with good crystallization characteristics by minimizing the difference between a desired reference value and an actual measured value in the energy value of the laser beam applied to the sample.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A laser annealing apparatus, comprising:

a laser generating section that produces a laser beam;

an energy controller connected to the laser generating section to control the energy of the laser beam;

a splitter disposed in a path of the laser beam, the splitter adapted to partially reflect the laser beam;

a first energy detector connected to the energy controller and arranged to receive the reflected laser beam from the splitter and to measure the heat of the reflected laser beam in terms of energy units and to convert the measured heat energy to a first electrical output signal;

an optical part disposed in the path of the laser beam, the optical part transmitting the laser beam toward a substrate; and a second energy detector connected to the energy controller and arranged to receive part of the transmitted laser beam applied to the substrate from the optical part and to measure the heat of the transmitted laser beam in terms of energy units and to convert the measured heat energy of the laser beam to a second electrical output signal;

wherein the controller controls the laser generating section in response to the first output signal and in response to the second output signal.

2. The laser annealing apparatus of claim 1, wherein the controller comprises:

a comparator arranged to receive the first and second output signals and compares them with a reference value and outputs a third output signal in response to a difference among the first and second output signals and the reference value; and a power supply connected to the comparator to control the laser generating section in response to the third output signal.

3. The laser annealing apparatus of claim 2, wherein the controller comprises:

a comparator arranged to receive the first and second output signals and compares them with a reference value and outputs a third output signal in response to a difference among the first and second output signals and the reference value; and a power supply connected to the comparator to control the laser generating section in response to the third output signal.

4. The laser annealing apparatus of claim 1, wherein the splitter reflects about 1% of the laser beam to the first detector.

5. The laser annealing apparatus of claim 1, wherein the optical part is a process window.

* * * * *